United States Patent Office 3,709,957
Patented Jan. 9, 1973

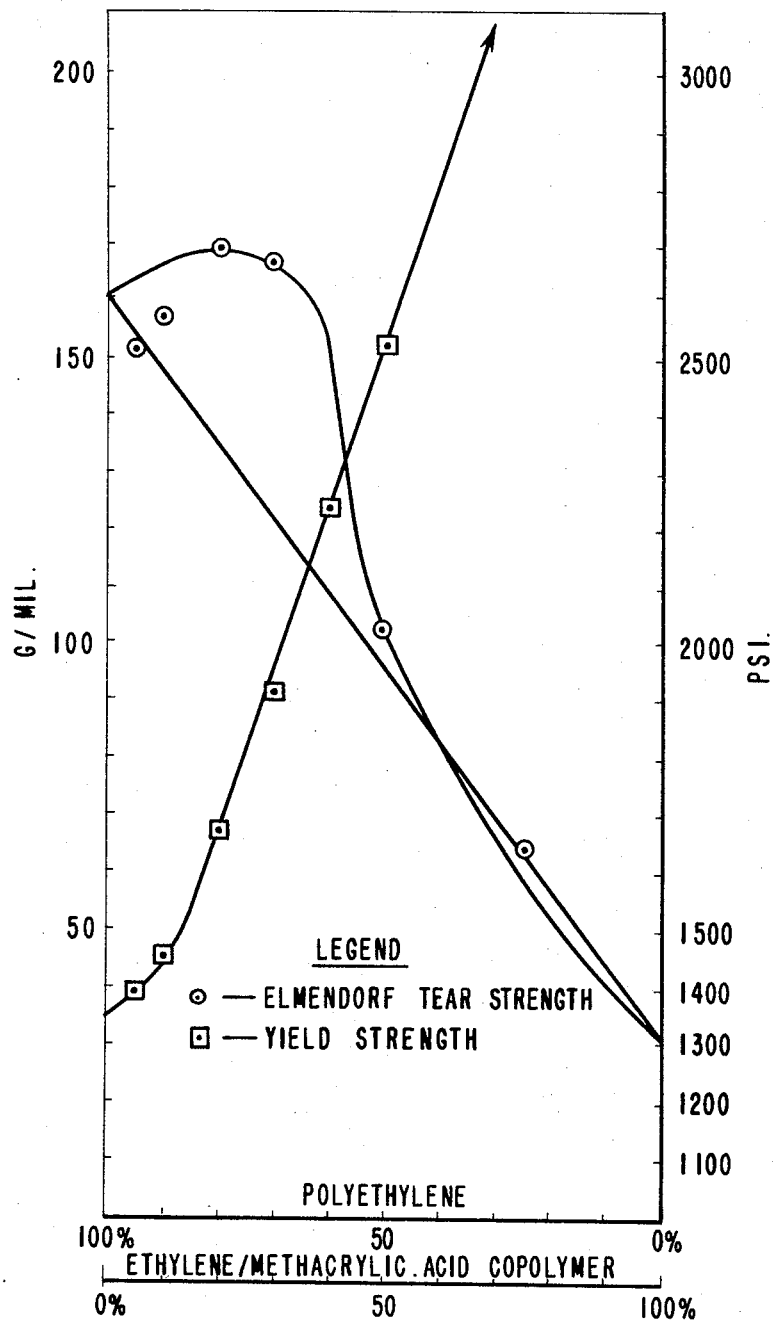

3,709,957
POLYETHYLENE BLENDS OF ETHYLENE-METHACRYLIC ACID COPOLYMER AND POLYETHYLENE
Donald Lee Brebner, Orange, Tex., assignor to E. I. du Pont de Nemours and Company, Wilmington, Del.
Filed Sept. 2, 1964, Ser. No. 393,928
Int. Cl. C08f 15/04, 15/14
U.S. Cl. 260—897 B
4 Claims

ABSTRACT OF THE DISCLOSURE

Polymeric blends consisting of ethylene-methacrylic acid copolymers and polyethylene.

---

The present invention relates to polyethylene blends, and, more particularly, to blends of polyethylene and copolymers of ethylene and methacrylic acid.

It is the primary object of the present invention to provide polyethylene blends which can be melt extruded into films that combine a high degree of toughness with a high yield strength.

The blends of the present invention comprise two component blends of (a) a copolymer of ethylene and methacrylic acid, containing from one to five mole percent, based on copolymer, of the acid and having a melt index in the range of 0.5 to 50 dg./min. with (b) 10 to 50 weight percent, and preferably 20 to 40 weight percent, based on the blend, of a polyethylene having a density of 0.910 to 0.970 g./cc., and preferably a density of 0.945 to 0.970 g./cc. and a melt index in the range of 0.1 to 20 dg./min.

The attached figure graphically illustrates some of the physical properties of the blends of this invention.

The use of polyethylene film as packaging material in the form of bags to package fertilizer and other pulverulent material is well known. In order to qualify for such industrial packaging uses, it is essential that the resin employed for the bags combine toughness with high yield strength to prevent bursting and tearing of the bags during shipping and/or storage. The most widely used method employed to measure film toughness is Elmendorf Tear Strength ASTM-D-1424-56-T, and the most widely used method employed to measure yield strength is ASTM-D-1530-58-T.

It is generally true that an increase in the yield strength of a polyethylene composition causes a corresponding decrease in the toughness of the resin. Yield strength can be increased in polyethylene by increasing the density or crystallinity of a resin through polymerization techniques which reduce the number of short chain branches in the resin. Toughness of a resin can be improved by copolymerization with polar comonomers such as vinyl acetate, ethyl acrylate, methyl methacrylate, methacrylic acid, etc. These comonomers, although increasing the toughness of the resin, decrease the crystallinity of the polymer and also the yield strength. The same decrease in crystallinity and yield strength is observed when blends of polyethylene and an ethylene vinyl ester copolymer of an ethylene alkyl acrylate copolymer containing small amounts of copolymer are compared with blends containing large amounts of copolymer. However, in accordance with the present invention, it was discovered that blends of polyethylene, and particularly high density polyethylene with ethylene-methacrylic acid copolymers, show increasing yield strength as the polyethylene component is increased, as would be expected, but that surprisingly the toughness of the film does not decrease but remains substantially that of the ethylene acid copolymer and may even increase until the concentration of the polyethylene approaches 50 percent of the blend composition after which the film toughness of the blend decreases with increasing polyethylene contents.

The ethylene-methacrylic acid copolymers employed in the present invention are preferably uniformly random copolymers, i.e., copolymers which contain substantially the same acid concentration in all of the molecules and have the acid comonomer distributed in a random manner in each of the molecules of the copolymer. The uniformly random copolymers are preferred in the process of the present invention since they permit completely homogeneous blends in which both components are compatible with each other. Non-uniform copolymers which contain high localized acid concentrations in their molecular structure, are not readily compatible and, thus, do not give rise to optimum values in the properties characteristic of the blends of the present invention. As a result of the significantly higher reactivity of methacrylic acid in polymerization as compared to ethylene, any polymerization in which the acid concentration decreases during polymerization will result in non-uniform and non-random copolymers. Hence, the copolymers suitable in the present invention are those obtained in the polymerization environment in which the acid concentration, the ethylene concentration, and the resulting copolymer concentration is maintained constant. Constant environment polymerization reactors and processes are described in the prior art such as Canadian Pat. 655,298, issued Jan. 1, 1963.

The blends of the present invention are prepared by standard techniques. One preferred method comprises dry blending the two components and then extruding the mixture through an extruder equipped with a working torpedo in the screw which homogenizes the molten polymer components of the blend. The resulting blend is then extruded and pelletized. The pelletized blend can then be extruded into film using conventional extrusion equipment and procedures to give rise to films with the aforesaid combination of toughness and tensile properties.

The properties of the blend of the present invention are further illustrated in Table I. The data illustrated were obtained using a two inch extruder and a 10 mil annular film die of 4 inches diameter. The polymer melt was heated to 190° C. at the extrusion die and the screw speed was adjusted to deliver about 40 lbs. of polymer per hour. The film was taken off at a rate of 12 f.p.m. and blown up to twice the diameter of the die. The resulting film had film gauge of approximately five mils. All melt index values illustrated in the table and otherwise employed in the description of this invention are based on ASTM-D-1238-57-T.

TABLE I

| Resin No. | Polyethylene Percent | M.I. | Density | Methacrylic acid copolymer Percent | Percent methacrylic acid | M.I. | Melt index of blend | Elmendorf tear strength in g./mil MD | TD | Avg. | Yield strength in p.s.i. |
|---|---|---|---|---|---|---|---|---|---|---|---|
| 1 | 5 | 0.5 | 0.955 | 95 | 10 | 2.5 | 2.11 | 155 | 146 | 151 | 1,390 |
| 2 | 10 | 0.5 | 0.955 | 90 | 10 | 2.5 | 1.93 | 158 | 157 | 157 | 1,450 |
| 3 | 20 | 0.5 | 0.955 | 80 | 10 | 2.5 | 1.60 | 161 | 177 | 169 | 1,670 |
| 4 | 30 | 0.5 | 0.955 | 70 | 10 | 2.5 | 1.47 | 154 | 180 | 167 | 1,910 |
| 5 | 40 | 0.5 | 0.955 | 60 | 10 | 2.5 | 1.30 | 159 | 142 | 151 | 2,240 |
| 6 | 50 | 0.5 | 0.955 | 50 | 10 | 2.5 | 1.11 | 98 | 106 | 102 | 2,520 |
| 7 | 75 | 0.5 | 0.955 | 25 | 10 | 2.5 | 0.55 | 58 | 69 | 64 | 3,610 |
| 8 | 0 | | | 100 | 10 | 2.5 | | 169 | 167 | 168 | 1,570 |
| 9 | 100 | 0.5 | 0.955 | 0 | | | | 30 | 81 | 56 | 3,840 |
| 10 | 0 | | | 100 | 7.0 | | | 223 | 144 | 182 | 1,350 |
| 11 | 0 | | | 100 | [1] 2.5 | 0.5 | | 56 | 92 | 74 | 1,550 |
| 12 | 20 | | | 80 | [1] 8 | 0.8 | 1.0 | 151 | 150 | 150 | 1,260 |
| 13 | 100 | 0.5 | 0.918 | | | | | 74 | 58 | 66 | 1,600 |

[1] Vinyl acetate.

Table I illustrates in resins 1 to 5 how the toughness of the film is maintained while the yield strength of the film is increased with increasing contents of the polyethylene component. Resins 6 and 7 illustrate that the toughness decreases rapidly as more than 50 percent of polyethylene is used in the blend. Resins 8 and 9 shows the properties of the blend components. Resin 10 illustrates the film properties of an acid copolymer containing about 7.0 percent of methacrylic acid and thus corresponding in acid content to resin 4. Resins 11 and 12 illustrate the film properties of an ethylene-vinyl acetate copolymer and a blend of an ethylene vinyl acetate copolymer and polyethylene showing a decrease in toughness with no significant improvement in tensile properties. Resin 13 illustrates the film properties of a low density polyethylene with film toughness values considered to be good for polyethylene.

The surprising features of the novel blends are further illustrated in the attached figure where the composition of the blend, based on the percentage of ethylene-methacrylic acid copolymer is plotted against the toughness of the film. As can be seen from the line directly drawn between the film toughness of each resin component, the toughness of the blends of the present invention is significantly higher, where the concentration of polyethylene is from 10 to 50 percent, than would be expected from their composition.

The blend compositions of the present invention are primarily employed in the manufacture of film which is used in industrial packaging applications, particularly in the bagging of chemicals such as fertilizer. The inertness of the ethylene polymers combined with the above-outlined mechanical properties makes these materials particularly suitable for such purposes. However, it is to be understood that the utility of the blends of the present invention is not limited to such applications, and the blends can be employed in all applications developed for polyethylene, such as molding, extrusion into fiber or pipe and in the coating of wire and other substrates.

Although the blends of the present invention are illustrated as two component blends, it is to be understood that the illustration is merely of the types of polymeric materials that are employed. Thus, it is feasible to employ two polyethylene components giving rise to a blend having the indicated properties for the polyethylene. Similarly, it is possible to have more than one acid copolymer present in the acid copolymer component of the blend. Additives normally employed with polyethylene, e.g., antioxidant, ultraviolet light stabilizers, slip additives, antistatic agents, pigments, etc., may also be added to the blends of the present invention.

I claim:
1. A blend comprising uniformly random ethylene-methacrylic acid copolymer and the acid constitutes from 1 to 5 mole percent of the copolymer, said copolymer having a melt index of 0.5 to 50 dg./min., and 10 to 50 percent, based on the weight of blend composition, of polyethylene having a density of 0.910 to 0.970 g./cc. and a melt index of 0.1 to 20 dg./min.
2. The blend of claim 1 wherein the polyethylene has a density of 0.945 to 0.970 g./cc.
3. The blend composition of claim 1 in film form.
4. The blend of claim 1 wherein the polyethylene constitutes from 20 to 40 percent of the blend composition.

No references cited.

HARRY WONG, JR., Primary Examiner

U.S. Cl. X.R.

117—128.4, 161; 260—86.7, 87.3, 88.1; 264—95, 176